United States Patent
Greenbaum et al.

(10) Patent No.: US 12,017,777 B2
(45) Date of Patent: Jun. 25, 2024

(54) AIRCRAFT SEATING WITH DIRECT AISLE ACCESS

(71) Applicant: ACLA Studio LLC, El Segundo, CA (US)

(72) Inventors: Andrew Greenbaum, Hermosa Beach, CA (US); Victor Carlioz, Manhattan Beach, CA (US); Matthew Cleary, El Segundo, CA (US)

(73) Assignee: ACLA Studio LLC, El Segundo, CA (US)

( * ) Notice: Subject to any disclaimer, the term of this patent is extended or adjusted under 35 U.S.C. 154(b) by 114 days.

(21) Appl. No.: 17/390,525

(22) Filed: Jul. 30, 2021

(65) Prior Publication Data
US 2022/0033082 A1    Feb. 3, 2022

Related U.S. Application Data

(60) Provisional application No. 63/059,511, filed on Jul. 31, 2020.

(51) Int. Cl.
*B64D 11/06*    (2006.01)
(52) U.S. Cl.
CPC ........ *B64D 11/0601* (2014.12); *B64D 11/064* (2014.12); *B64D 11/0646* (2014.12)
(58) Field of Classification Search
CPC .. B64D 11/601; B64D 11/064; B64D 11/0646
See application file for complete search history.

(56) References Cited

U.S. PATENT DOCUMENTS

| | | | |
|---|---|---|---|
| 8,011,723 B2 | 9/2011 | Park et al. | |
| 8,690,254 B2 | 4/2014 | Cailleteau | |
| 9,096,322 B2 | 8/2015 | Hasegawa et al. | |
| 9,409,648 B2 | 8/2016 | Eakins | |
| 9,744,894 B2 | 8/2017 | Carlioz et al. | |
| 9,994,127 B2 | 6/2018 | Cheung et al. | |
| 2004/0232283 A1* | 11/2004 | Ferry | B64D 11/0604 244/118.6 |
| 2010/0038484 A1* | 2/2010 | Ersan | B64D 11/06 244/118.6 |
| 2012/0298798 A1 | 11/2012 | Henshaw et al. | |
| 2013/0241247 A1* | 9/2013 | Wallace | B64D 11/0604 297/118 |
| 2014/0283296 A1 | 9/2014 | Jerome et al. | |

(Continued)

FOREIGN PATENT DOCUMENTS

| | | |
|---|---|---|
| EP | 2900555 B1 | 9/2013 |
| EP | 3129289 B1 | 2/2017 |

(Continued)

*Primary Examiner* — Brady W Frazier
*Assistant Examiner* — Shanna Danielle Glover
(74) *Attorney, Agent, or Firm* — Dergosits & Noah LLP

(57) ABSTRACT

A seating assembly provides direct aisle access for each seat in a row by employing a seat angling with respect to a cabin centerline. The seat angling opens up an area behind each seat back. Seat density may be increased by staggering the seats such that the opened area behind a forward row may be used to provide an armrest for a passenger in a next row. Seat density may be even further increased by overlapping the assemblies (as seen facing the seat) such that: the armrest for the forward row seat overlaps the legroom of the next row seat.

23 Claims, 15 Drawing Sheets

(56) References Cited

U.S. PATENT DOCUMENTS

| | | |
|---|---|---|
| 2015/0225086 A1 | 8/2015 | Darbyshire |
| 2016/0083093 A1 | 3/2016 | Tighe et al. |
| 2016/0272323 A1 | 9/2016 | Carlioz |
| 2018/0105272 A1 | 4/2018 | Scott et al. |
| 2018/0265201 A1 | 9/2018 | Carlioz et al. |
| 2019/0092475 A1* | 3/2019 | Carlioz ............ B64D 11/00153 |
| 2021/0114732 A1* | 4/2021 | Williams ........... B64D 11/0646 |

FOREIGN PATENT DOCUMENTS

| | | | |
|---|---|---|---|
| WO | 2014049362 A1 | 4/2014 | |
| WO | 2015061688 A2 | 4/2015 | |
| WO | WO-2016049351 A1 * | 3/2016 | ............... B60N 2/06 |

* cited by examiner

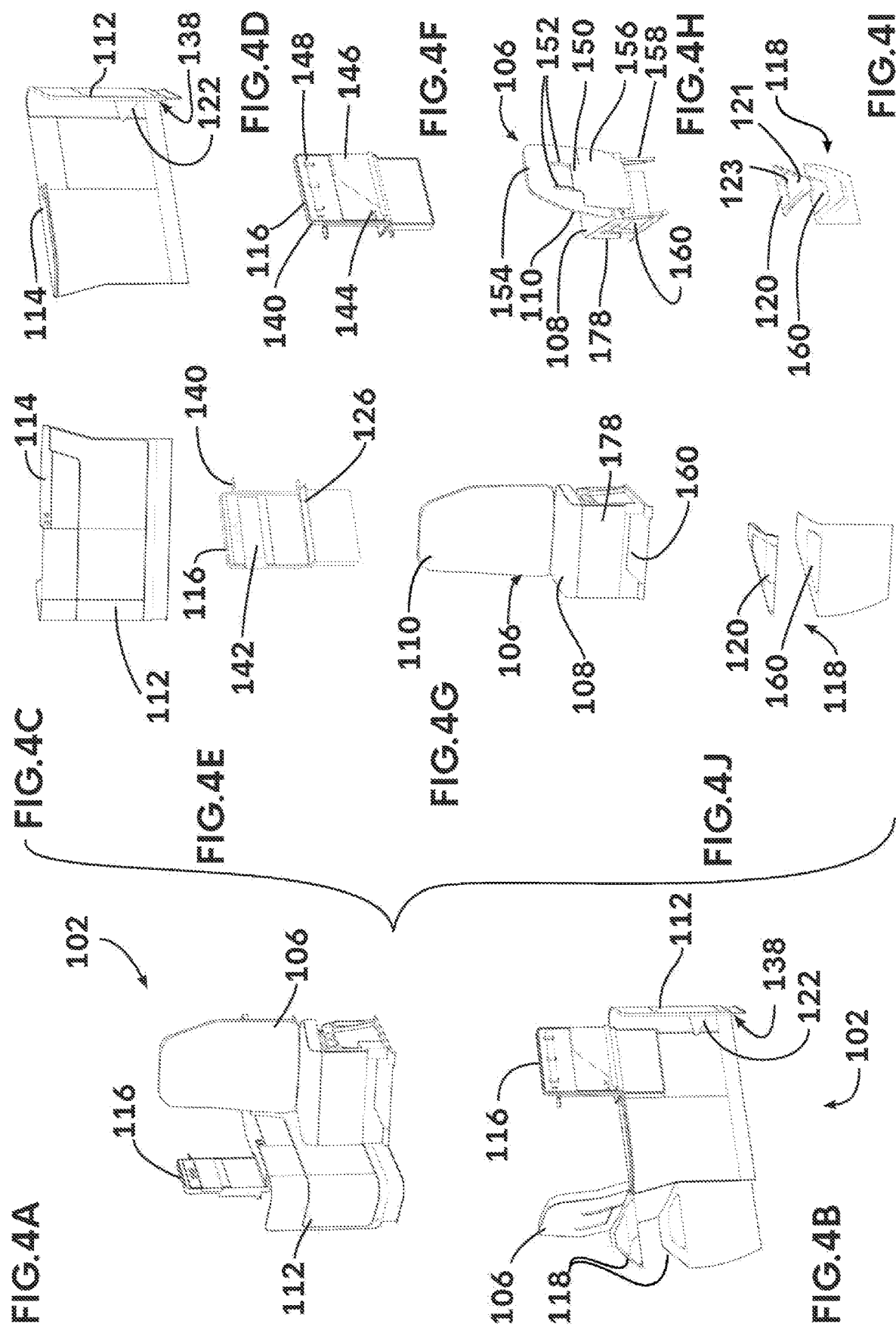

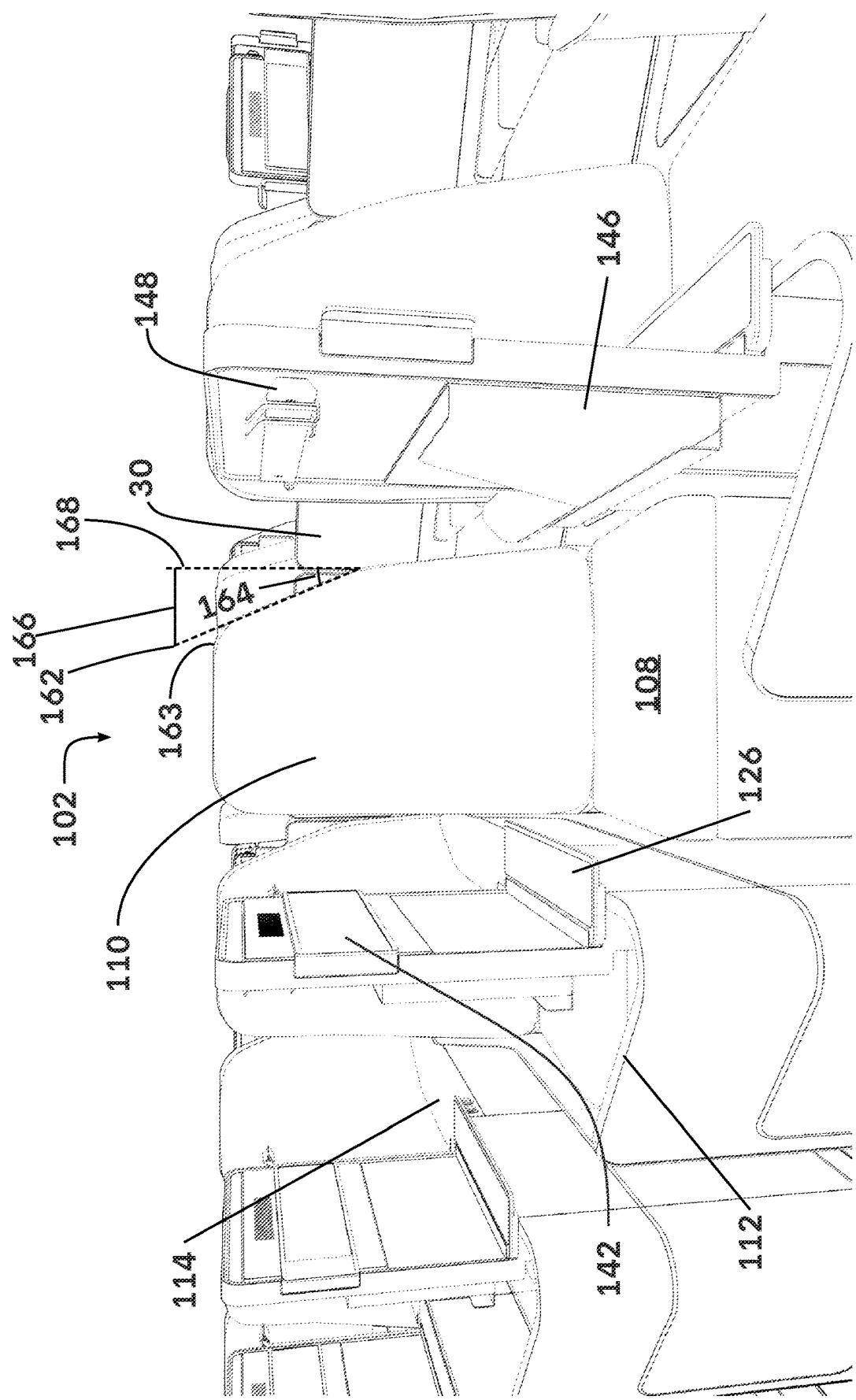

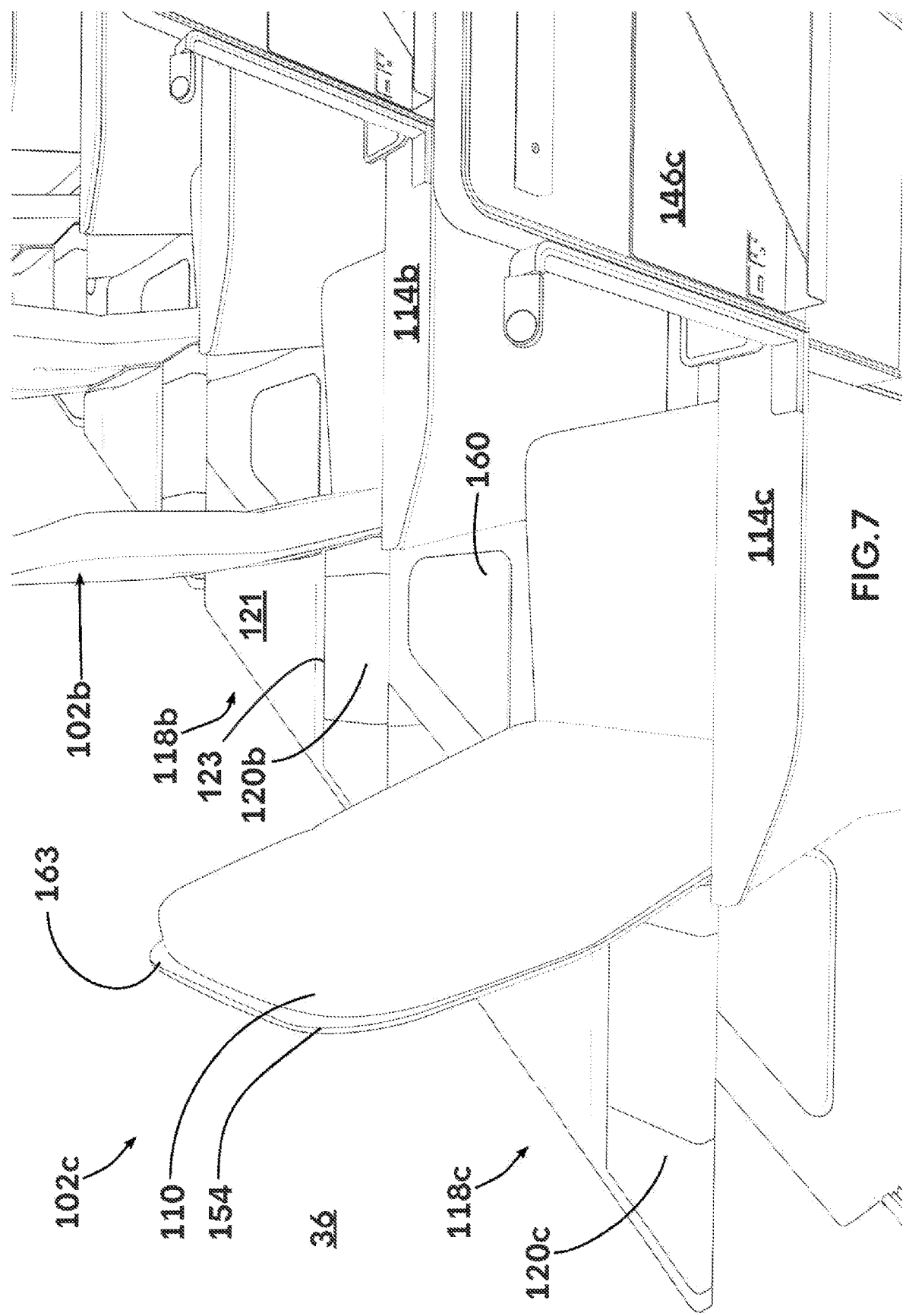

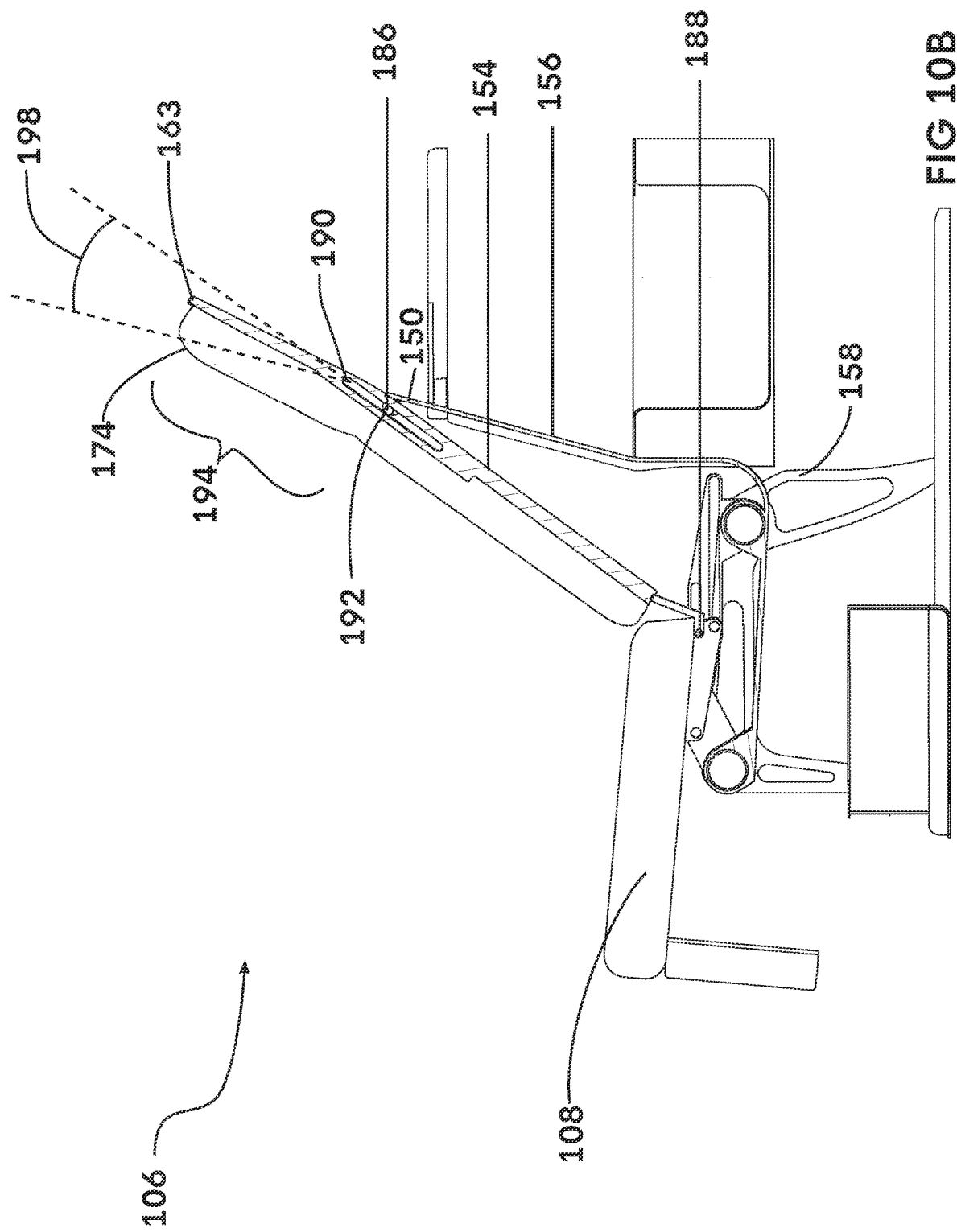

AIRCRAFT SEATING WITH DIRECT AISLE ACCESS

CROSS-REFERENCE TO RELATED CASES

The present application claims priority to U.S. Provisional Patent Application 63/059,511, entitled "PREMIUM ECONOMY SEAT WITH DIRECT AISLE ACCESS," filed on Jul. 31, 2020, which is hereby incorporated by reference.

TECHNICAL FIELD

The present invention relates to the field of seating, including, more particularly, to seating assemblies for vehicles that transport passengers, such as, e.g., aircraft.

BACKGROUND

Aircraft seating space is naturally limited. Typically, there is a compromise between passenger space and aircraft seating density. The compromise is between the seating density that provides the desired revenue per flight and the space per passenger that provides for a comfortable flight. As aspect of this compromise is that the premium economy-seat market is a growing market. It is situated between business class and economy class in terms of comfort and density. The existing seating arrangements for premium economy are usually very simple—including simply a bigger and wider version of an economy class seat, which impacts seat density proportionally. Similarly, for business classes that offer bed options, the typical arrangement negatively impacts seat density.

Thus, there exists a need for seating assemblies that offer significant width and comfort gains and reduce the negative impact on seating density.

BRIEF DESCRIPTION OF THE DRAWINGS

Objects, features, and advantages of the embodiments will become apparent upon consideration of the following detailed description and the accompanying drawings. The embodiments are illustrated by way of example and not limitation in the figures of the accompanying drawings, in which like references indicate similar elements, and in which:

FIG. 4A and FIG. 4B are front and rear perspective views, respectively, of elements of the embodiments of FIG. 1;

FIG. 4C and FIG. 4D are front and rear perspective views, respectively, of elements of the embodiments of FIG. 1;

FIG. 4E and FIG. 4F are front and rear perspective views, respectively, of elements of the embodiments of FIG. 1;

FIG. 4G and FIG. 4H are front and rear perspective views, respectively, of elements of the embodiments of FIG. 1;

FIG. 4I and FIG. 4J are front and rear perspective views, respectively, of elements of the embodiments of FIG. 1;

FIG. 6 is a seat-facing perspective view of details of the embodiments of FIG. 1;

FIG. 7 is a seat-side perspective view of details of the embodiments of FIG. 1;

FIG. 10B is seat-side cross-sectional view of the elements of FIG. 10B in a second state;

DETAILED DESCRIPTION

Figure 1:
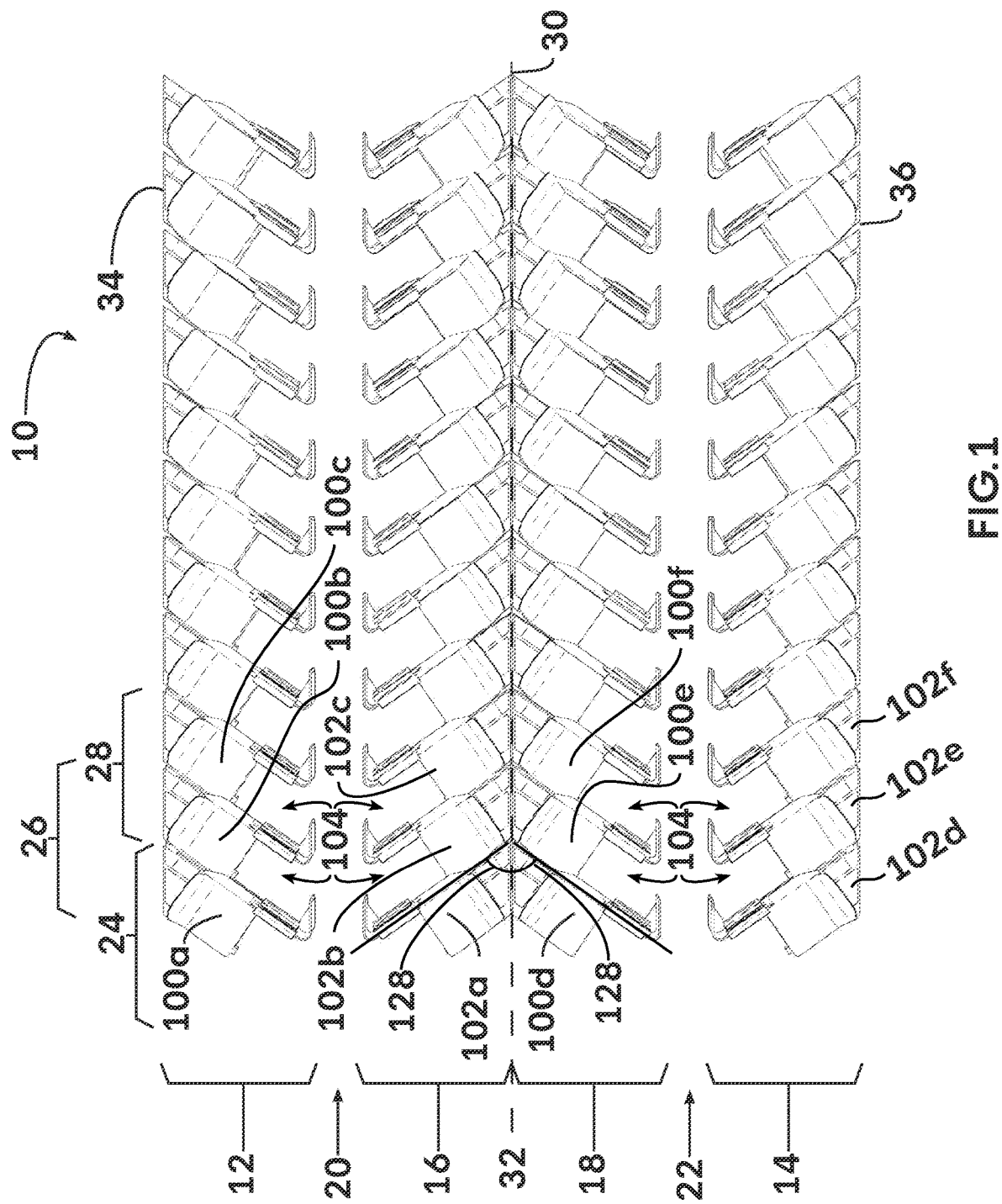
FIG. 1 is a top view of embodiments of a seating assembly.

Embodiments of a seating assembly offer a direct aisle access for each seat in a row. Embodiments may also offer significant width gains, or increased seating density, or both. Features employed in embodiments to provide these benefits include one or more of: an angling of the seat centerline with respect to the cabin centerline; a seat stagger allowing a seat from one row to access an armrest attached to the back of a seat from a different row; or a seat overlap (perpendicular to the seat centerline) such that an armrest area in a forward seat of a staggered pair overlaps the armrest area for the rearward seat of the pair.

With the seats angled with respect to the cabin centerline, each seat in a row may provide the passenger with direct aisle access. The angling opens up room behind the seat back, between the seat back and a dividing wall or fuselage. The angling also improves legroom by directing the passenger's legs forward at an angle, which benefits form the additional distance of a hypotenuse when compared to the straight-ahead distance between seats. With a seat stagger, a seat in a first row is moved forward along its seat centerline with respect to a parallel seat in a next row. This allows the set-back seat in the next row to access the room behind the forward seat that was opened up by the angling. Thus, the stagger allows the set-back seat to have an armrest behind the set-forward seat. By offsetting the passenger's shoulder areas, the stagger also allows each seat to then be moved laterally toward the other (perpendicularly to the parallel seat centerlines), so that they overlap somewhat (as seen from the front). Thus, the overlap allows the pitch between seats to be compressed (as measured at the aisle), but does not affect the shoulder space dedicated to a passenger.

In an embodiment, seats may be configured as a row of seats in a 1-2-1 configuration, with a first seat on the right fuselage wall, second and third seats back-to-back in the center, and a fourth seat on left fuselage wall. In an embodiment, the first and third seat assemblies are identical and the second and fourth seat assemblies are identical (and mirror images of the first and third seat assemblies).

Embodiments provide a comparable seating density in a 1-2-1 configuration (window seat, aisle, two center seats, aisle, window seat), each seat with direct aisle access, in a cabin that typically employs a 2-3-2 configuration with seats facing directly forward and three of the seats lacking direct aisle access. Such 2-3-2 configurations may be found in, e.g., a Boeing 787 or Airbus A330. In the typical 2-3-2 configuration the distance from one row to the next (pitch) is between 38 to 42 in. Embodiments facilitate approaching or matching the density of the 2-3-2 configuration as follows. To arrive at a target pitch for embodiments, the 42 in. pitch divided by the 7 seats of a 2-3-2 configuration is equated to the target pitch divided by the 4 seats of the 1-2-1 configuration. 42/7=X/4, with X=24 in. being the target pitch for an embodiment.

FIG. 1 is a top view of embodiments of seat assemblies 100, 102 within a fuselage 10 having a right wall 34 and a left wall 36, and a cabin centerline 32. Seat assembly 100 is depicted by seat assemblies 100a . . . 100c, with the letter designation indicated a different row. Similarly, seat assembly 102 is depicted by seat assemblies 102a . . . 102c, with the letter designation indicated a different row. This specification will adhere to the convention that the number indicates an element and an associated letter indicates which seat assembly includes the numbered element. In the embodiment, seat assembly 102 is a mirror image of seat assembly 100, e.g., across an aisle 20, 22, or a center divider 30. Thus, seat assemblies 100a . . . 100c in a window seat section 12 are identical, and are identical to seat assemblies 100d . . . 100f in a center section 18. Similarly, seat assemblies 102a . . . 102c in center section 16 are identical, and are identical to seat assemblies 102d . . . 102f in a window seat section 14.

In FIG. 1, a first row 24 includes seat assemblies 100a, 102a, 100d, and 102d in a 1-2-1 arrangement in which seat assemblies 102a, 100d are back-to-back mirror images of each other on opposite sides of center divider 30. A second row 26 is identical to row 24 and includes seat assemblies 100b, 102b, 100e, 102e, and a third row 28 is identical to row 26 and includes seat assemblies 100c, 102c, 100f, 102f. In the embodiments, each seat assembly has direct aisle access 104 to either aisle 20 or aisle 22 that is provided by the seat assembly being angled 128 to the left (e.g., seat assembly 100a) or angled 128 to the right (e.g., seat assembly 102a) with respect to the cabin center axis 32. The configuration of FIG. 1 creates a density competitive with existing traditional seat layouts while offering direct access to the aisle.

In the embodiment, the seat assemblies may be angled 128 with respect to the cabin centerline with an angle of 55 degrees, or with an angle greater than or equal to 50 degrees and less than or equal to 60 degrees, or with an angle greater than or equal to 45 degrees and less than or equal to 65 degrees. In embodiments, angle 128 is consistent among seat assemblies in a section, e.g., window section 12, since these seat assemblies are parallel. However, in embodiments, angle 128 could be different between sections, e.g., seat assemblies 100a . . . 100c in window section 12 could have a different angle 128 than seat assemblies 102a . . . 102c in center section 16.

In FIG. 1, the distance from one row of seats to the next is 24 inches, as measured along the axis of the plane. In other words, the pitch of the embodiment is 24 inches. Where shown in other figures, the pitch is also 24 inches. However, in embodiments, the pitch may vary, e.g., pitches of from 21 to 28 inches are contemplated without departing from the teachings of this specification.

In the embodiment of FIG. 1 each seat assembly 100, 102 is a separate unit that is not attached to an adjacent unit. Thus, each row includes four singular seat assemblies. Seat assemblies in adjacent rows are independent from each other in the sense that they are not connected. However, seat assemblies in adjacent rows cooperate with each other by creating the seating environment for a passenger, i.e., a divider 112a attached to assembly 102a creates one side of the environment for seating assembly 102b.

Figure 2:
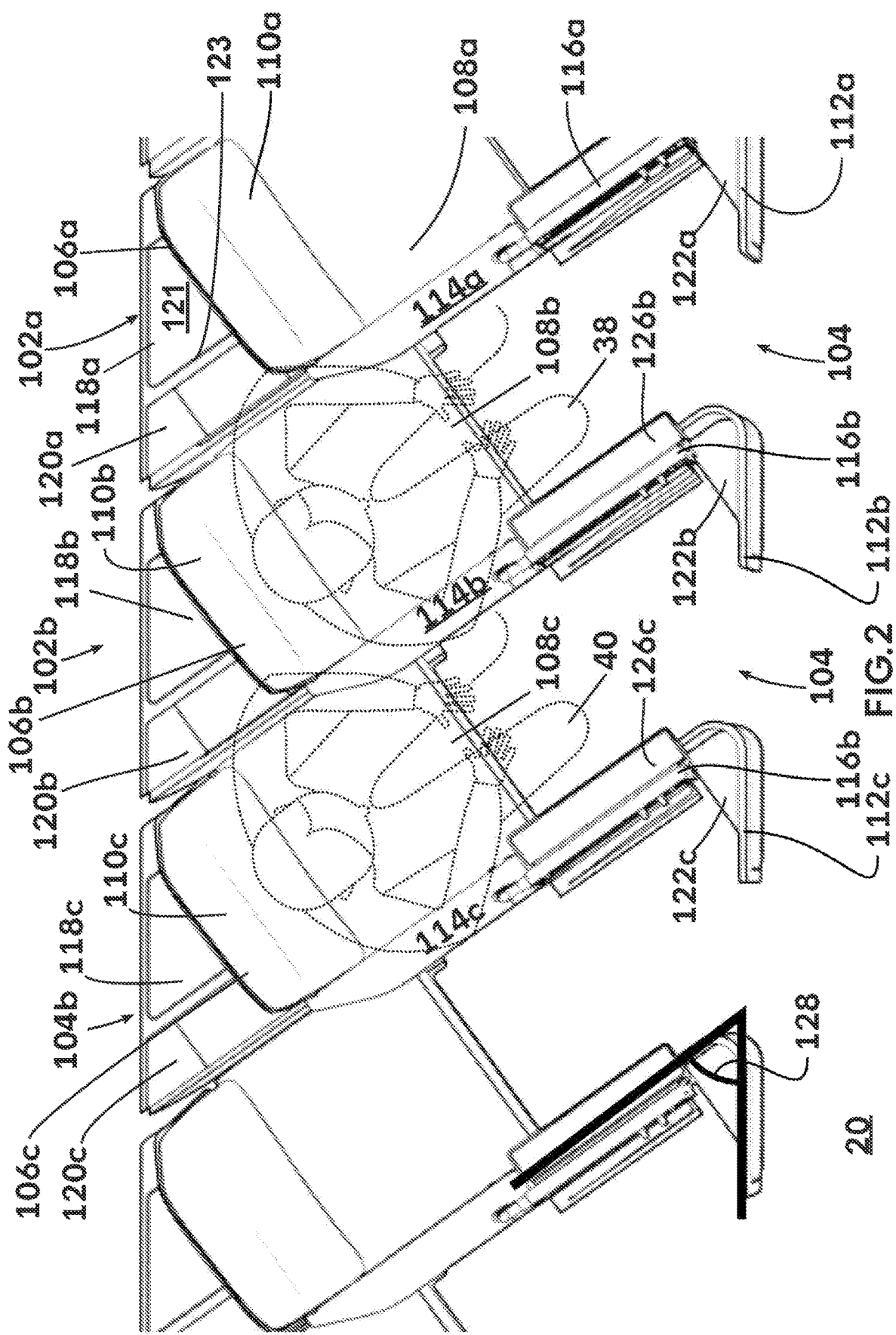
FIG. 2 is a top view of details of the embodiments of FIG. 1.

FIG. 2 is a top view of details of the embodiments of FIG. 1. Each seat assembly is shown to include a seat 106. This specification will follow a convention that the number indicates an element and an associated letter indicates which seat assembly includes the numbered element. For example, seat assembly 102a includes a seat 106a and seat assembly 102b includes a seat 106b. The descriptions of the element number apply equally to all similarly numbered elements regardless of their letter designation.

Continuing with regard to FIG. 2, seat 106 includes a seat pan 108 and a seat back 110. Each seat assembly further includes a divider 112 that itself includes an armrest 114, e.g., armrests 114a . . . 114c, configured to be accessed by the passenger in that seat assembly, e.g., a passenger 38 in seat assembly 102b accesses armrest 114b. Divider 112 includes an amenities console 116. A rear console 118, e.g., rear consoles 118a . . . 118c, attached to the rear of seat assembly 102 includes an armrest 120, e.g., armrests 120a . . . 120c, that is assessable by the passenger in the next row, e.g., a passenger 40 in seat assembly 102c accesses armrest 120b. Rear console 118 includes an upper storage platform section 121 (see also 121 of FIG. 4I, FIG. 7, and FIG. 11), which tapers from a wider section 123 as platform section 121 extends away from armrest 120 and behind seat back 110, in addition to armrest 120 and a lower storage 160 (FIG. 4I), with armrest 120 pivoting upward to facilitate access to lower storage 160. The access to armrest 120b from passenger 40 in the next row is a result of the seat assemblies 102b, 102c being angled 128 with respect to centerline 32, and of seat assembly 102c being set back with regard to seat assembly 102b along the seat centerlines, which are parallel to armrests 114. A footrest 122 is accessible from each seat 106, at a bend in divider 112.

In FIG. 2, seat assembly 102b is populated with passenger 38 and seat assembly 102c is populated with passenger 40 to illustrate that angle 128 provides a number of benefits. A first benefit is that each seat assembly is directed to an aisle, e.g., aisle 20. A second benefit is that angle 128 opens up an area behind seat back 110 that may be filled with an armrest 120 usable by a passenger in a different row—passenger 40 is in row 28, a row behind passenger 38 in row 26. A third is that adjacent seats 106 may be moved toward each other so that their armrest overlap, as seen facing the seats. For example, armrest 114b for passenger 38 is in front of and overlapping armrest 120b for passenger 40. However, the overlapping of armrests in this manner does not reduce each passenger's shoulder space because of angle 128. Thus, passenger density may be increased without reducing each passenger's shoulder space.

Figure 3:
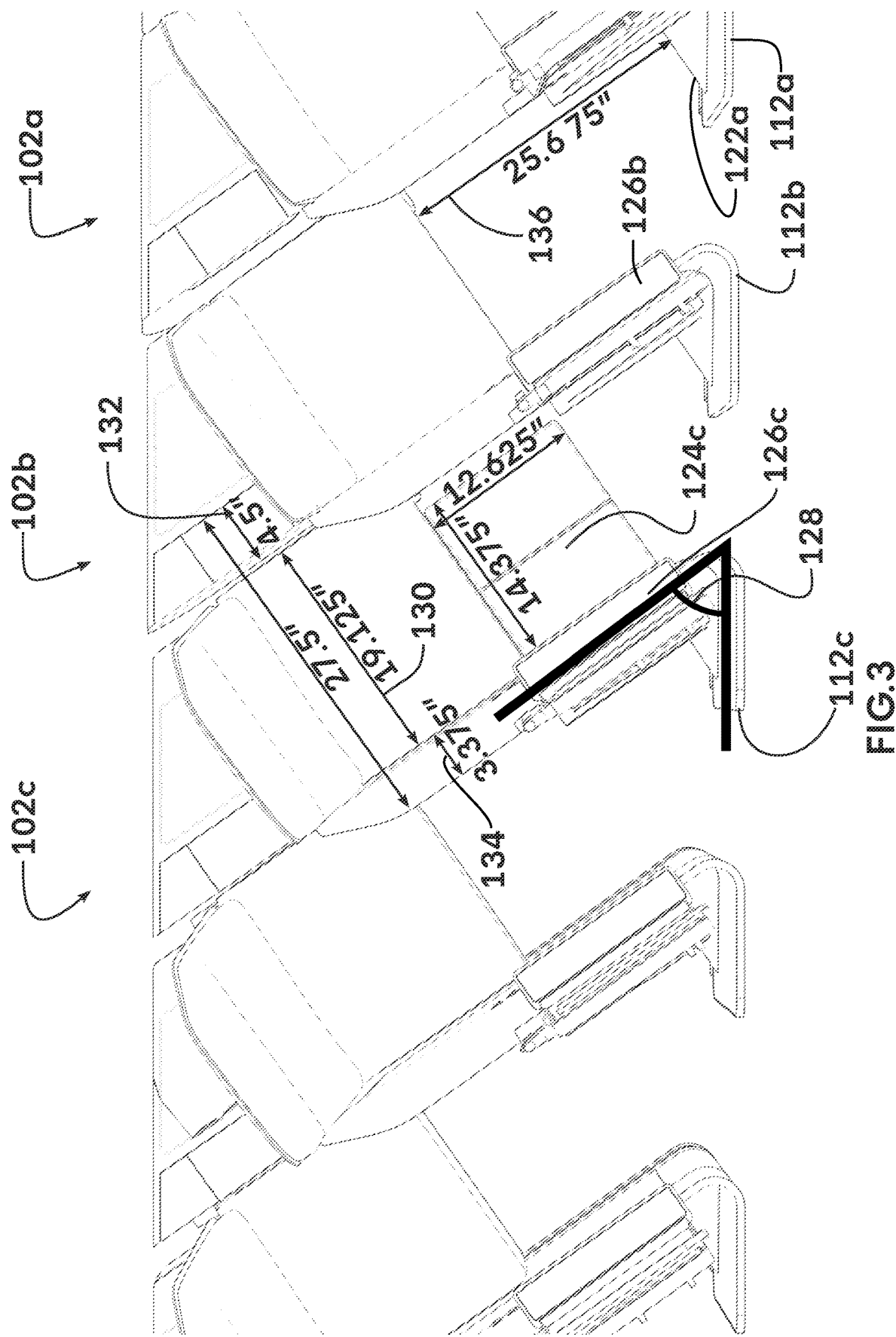
FIG. 3 is a top view of details of the embodiments of FIG. 1.

FIG. 3 is a top view of details of the embodiments of FIG. 1. In FIG. 3, seat assembly 102 is shown to be at an angle 128 from aisle 20, which is parallel to cabin centerline 32. FIG. 3 illustrates that seat assembly 102 may include a bi-folding table 124 that may be folded and stored beneath a hinged side table top 126 in amenities console 116 attached to divider 112.

FIG. 3 illustrates that an embodiment may have a seat width 130 of 19.125", an armrest 120 width 132 of 4.5", an armrest 114 width 134 of 3.375", and legroom 136 of 25.675".

FIG. 4A and FIG. 4B are front and rear perspective views, respectively, of elements of the embodiments of FIG. 1. In FIG. 4A and FIG. 4B, seat assembly 102 is shown to have four major components, including: seat 106, divider 112, amenities console 116, and rear console 118. FIG. 4B illustrates that divider 112 includes footrest 122 with a space 138 below it for storing, e.g., shoes. In the embodiment, seat 106, divider 112, amenities console 116, and rear console 118 are connected together as a singular unit, which is installed in a cabin in parallel with identical units as shown in FIG. 1. Seat assembly 100 is a mirror image of assembly 102.

FIG. 4C and FIG. 4D are front and rear perspective views, respectively, of divider 112. FIG. 4C and FIG. 4D illustrate that divider 112 includes armrest 114 accessible by a passenger in seat 106. In the embodiment, divider 112 is connected to a frame 158 (FIG. 4H), which may also be known as a "support structure," of seat 106. Divider 112 then extends from the rear of seat 106 to the aisle, at which point divider 112 folds and follows the line of the aisle, partially enclosing the legroom of the seat in the next row. In the fold, footrest 122 is provided for the seat in the next row, as well as storage space 113S. Divider 112 supports the passenger comfort features for both seat 106 and the seat in the next row, as shown in FIG. 4E and FIG. 4F. With armrest 114 on divider 112 extending in front of the seat in the next row and directly over the leg room of the next row, and armrest 120 on rear console 118 extending behind seat 106, additional width is created for both passengers in the adjacent seats.

FIG. 4E and FIG. 4F are front and rear perspective views, respectively, of amenities console 116. FIG. 4E illustrates that the side of amenities console 116 for use by the passenger of seat 106 includes a reading light 140, a monitor 142, and side table 126, which pivots upward to reveal folding table 124. As shown, monitor 142 is in the stowed position, with the face of monitor 142 hidden against console 116. FIG. 4F illustrates that the amenities for use by a passenger in the next row include a power supply 144, a storage shelf 146 (see also FIG. 6 and storage shelf 146c (FIG. 7)) with large and small storage slots, and sliding hooks 148 for hanging various items. In an embodiment, reading light 140 may be activated by being tilted toward the passenger, e.g., 45 degrees, with the opposite motion turning the light off Hooks 148 may each include a top and bottom hook and slide along a channel. Thus, amenities console 116 is a sub assembly designed to house most of the passenger comfort features. As a sub assembly, console 116 simplifies the seat design and provides a modular solution that can improve weight, maintainability, and electric wiring complexity by have a single assembly designed as a plug and play unit.

FIG. 4G and FIG. 4H are front and rear perspective views, respectively, of seat 106, which includes seat pan 108, seat back 110, a leg extension 178, and lower storage 160. FIG. 4H further illustrates that seat back 110 includes a back plate 154. Frame 158 is connected to a fixed structure 156, which may also be known as a "seat back support," that includes a sliding pivot 150. When seat back 110 reclines, seat pan 108 moves forward with respect to frame 158 and the bottom of seat back 110 and back plate 154 move forward with seat pan 108. As the bottom of back plate 154 moves forward, pivot tracks 152 slide down with respect to sliding pivot 150. As the bottom of back plate 154 moves forward, the top of back plate 154 pivots about sliding pivot 150 and moves backward. Because back plate 154 pivots about sliding pivot 150 and moves down along tracks 152 when it reclines, the distance that the top of backplate 154 moves backward is reduced, and seat 106 may be positioned closer fuselage wall 34, 36, or center divider 30 as a result.

FIG. 4I and FIG. 4J are front and rear perspective views, respectively, of rear console 118. Rear console 118 is attached to fixed structure 156. As a result, rear console 118 does not move when seat back 110 reclines. FIG. 4J illustrated that access to storage 160 is provided by pivoting armrest 120 up. FIG. 4J and FIG. 4I illustrate the additional area created by angle 128 of seat 106 with respect to the cabin centerline 30. In other words, there would be no room behind back plate 154 for rear console 118 if seat 106 were parallel or perpendicular to cabin centerline 30. Thus, with angle 128 providing space for rear console 118, a passenger in a row next to seat 106 is provided with a dedicated armrest 120 and storage 160 without encroaching on the space of a passenger occupying seat 106.

Figure 5A:
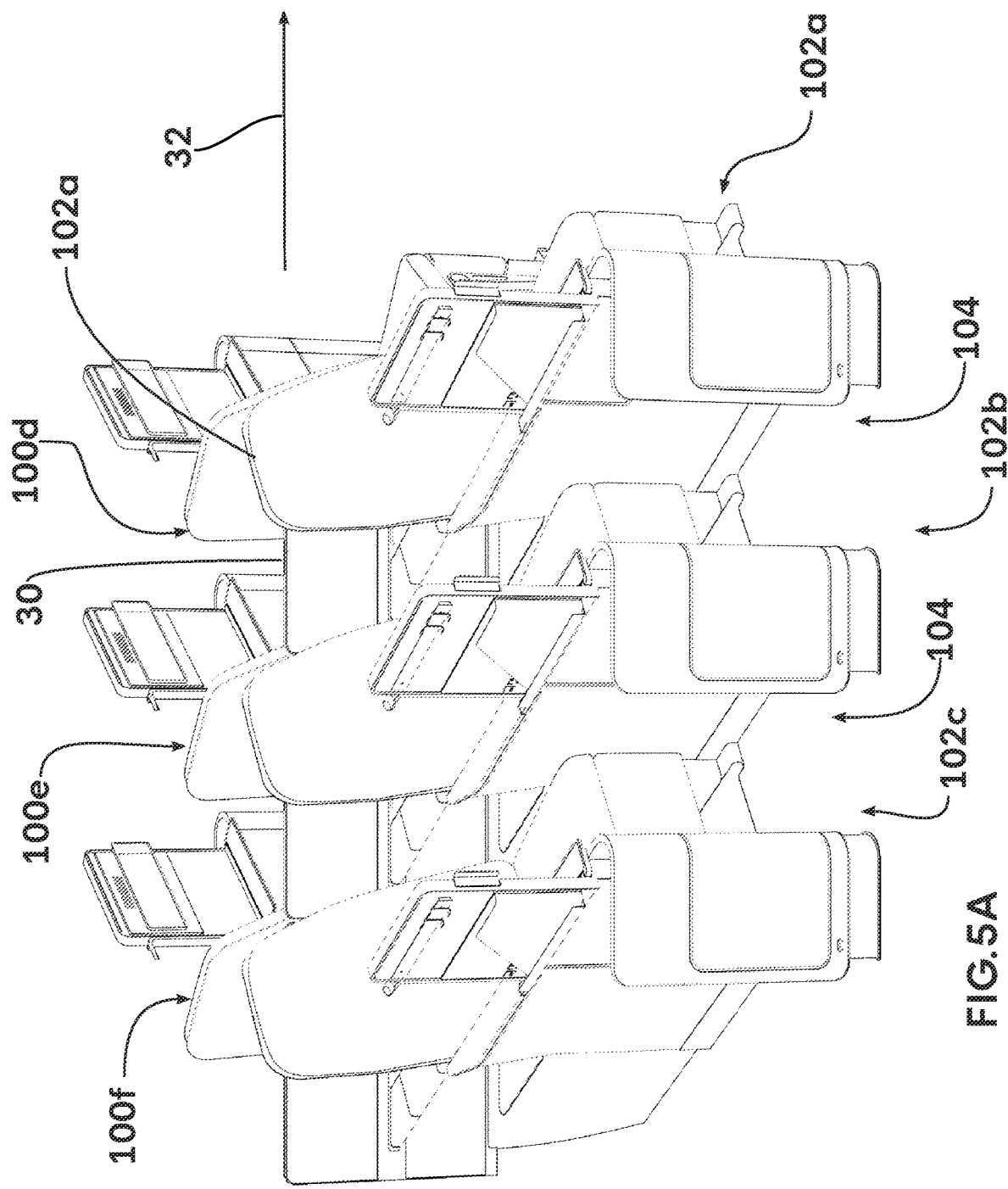
FIG. 5A is a top right perspective view of details of the embodiments of FIG. 1.

FIG. 5A is a top right perspective view of details of the embodiments of FIG. 1. In FIG. 5A, seat assemblies 102a . . . 102c are mirror images of seat assemblies 100d . . . 100f across center divider 30. As shown, the rear consoles 118 of seat assemblies 100d . . . 100f and 102a . . . 102c may abut center divider 30. With rear consoles 118 abutting center divider 30, seat backs 110 are configured to recline and slide with respect to sliding pivot 150 so that the tops of seat backs 110 do not contact center divider 30. An asymmetrical corner 163 (discussed further with regard to FIG. 6) allows the top of seat back 110 to pivot further back without contacting center divider 30. The same seat assemblies shown in FIG. 5A may be positioned against the fuselage as window seats, e.g., assemblies 102a . . . 102c may be positioned at left fuselage wall 36 (as shown in FIG. 5B) and assemblies 100d . . . 100f may be positioned at right fuselage wall 34.

Figure 5B:
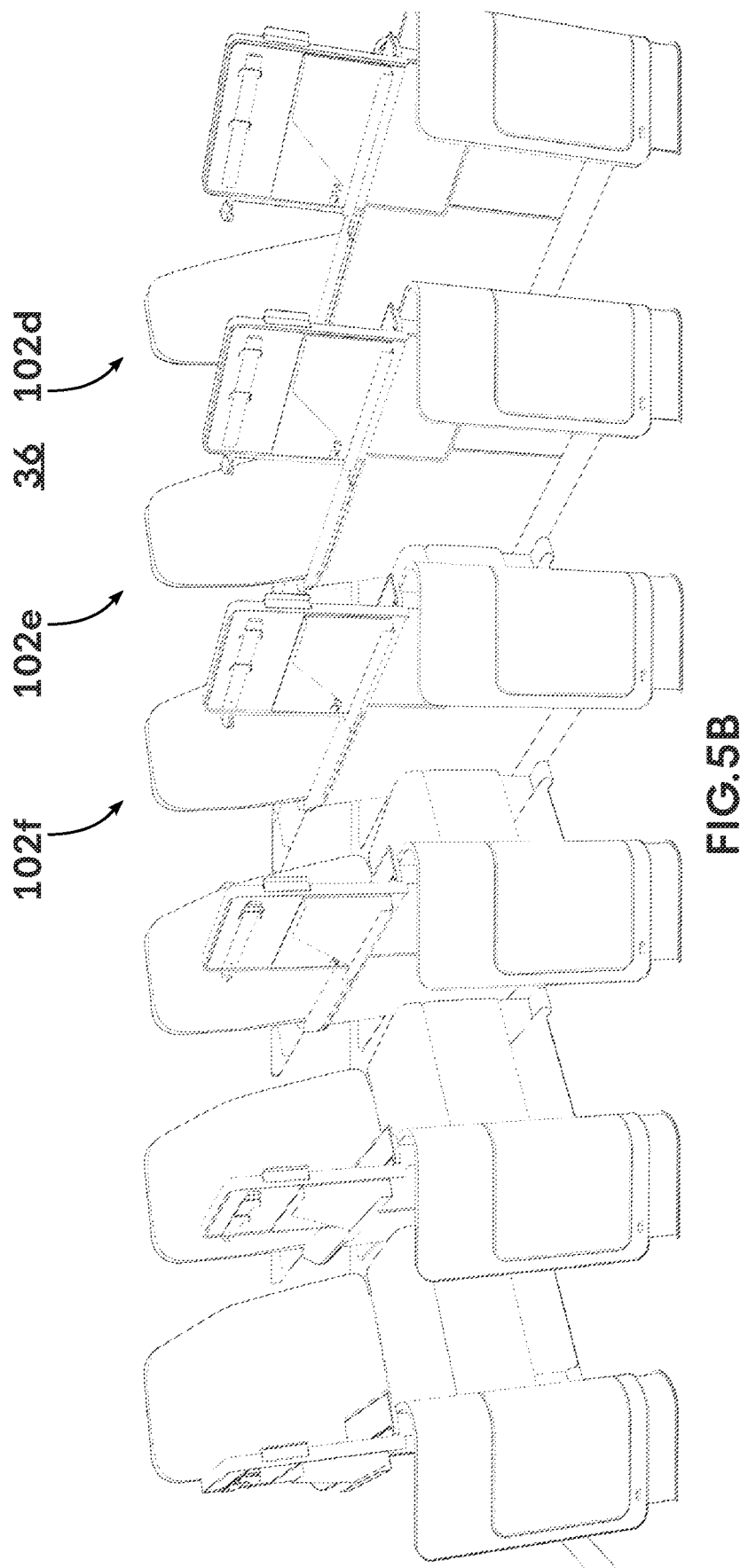
FIG. 5B is a top right perspective view of details of the embodiments of FIG. 1.

FIG. 5B is a top right perspective view of details of the embodiments of FIG. 1. FIG. 5B illustrates seat assemblies 102d . . . 102f against left fuselage wall 36. Except for the cabin position, assemblies 102d . . . 102f are identical to assemblies 102a . . . 102c of FIG. 5A. Thus, only two seat assemblies 100, 102 may be used to fill a cabin and provide a 1-2-1 configuration in which each seat has direct aisle access.

FIG. 6 is a seat-facing perspective view of details of the embodiments of FIG. 1. FIG. 6 illustrates an asymmetry 162 in seat back 110 that contributes to the seat density by allowing seat assemblies 100, 102 to be positioned closer to the fuselage wall or center divider and still allow seat back 110 to fully recline. With seat assembly 102, 100 angled at angle 128 with respect to cabin centerline 32, when seat back 110 is reclined, asymmetrical corner 163 will strike center divider 30 or fuselage wall 34, 36 before the other corner of seat back 110. To allow seat back 110 to recline fully, corner 163 is designed to be asymmetrical and not to extend as far laterally as the opposing corner from a seat centerline. In the embodiment, asymmetry 162 is created by the effective "removal" of a roughly triangular section of seat back 110 with an X-dimension 166, a Y-dimension 168, and an associated angle 164. Thus, seat back 110 may recline further back toward center divider 30 or fuselage wall 34, 36 because asymmetry 162 has been created. In an exemplary embodiment, the total with of seat back 110 may be 17.765 in., with an X-dimension 166 of 4.45 in., a Y-dimension 168 of 10.09 in., and an angle 164 of 23.8 degrees.

FIG. 7 is a seat-side perspective view of details of the embodiments of FIG. 1. FIG. 7 illustrates how asymmetrical corner 163 is closest to fuselage wall 36, which explains why asymmetry 162 allows seat back 110 to recline further. FIG. 7 further illustrates how rear console 118b provides armrest 120b and additional platform storage (e.g., for reading and drinking glasses, as illustrated) accessible from seat assembly 102c, which is a row behind rear console 118b. FIG. 7 also shows that armrest 120b and armrest 114b are entirely dedicated to seat assemblies 102c, 102b, respectively. In addition, armrest 114b is shown to extend over the legroom of seat assembly 102c without interfering with that legroom.

Figure 8A:
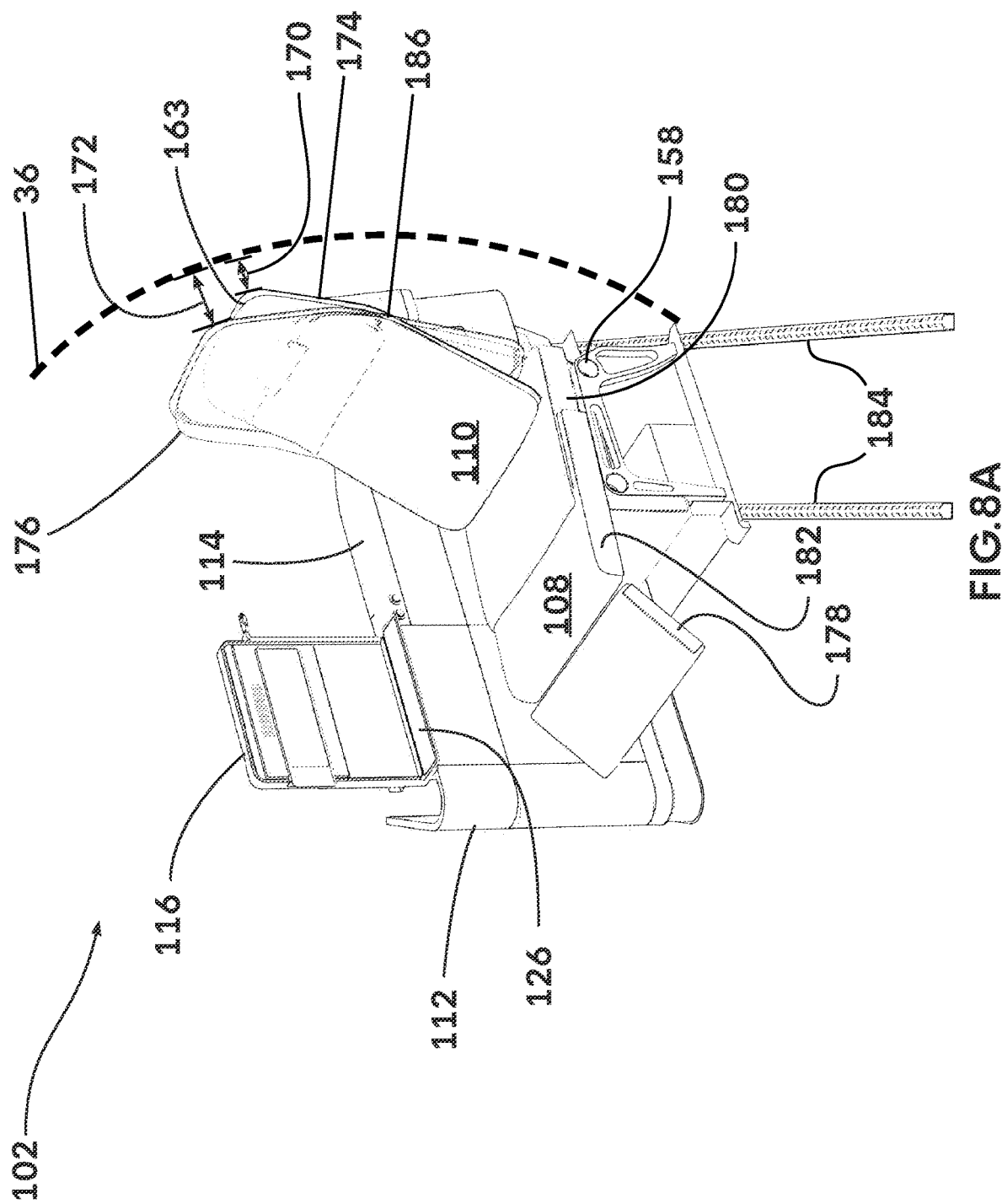
FIG. 8A is a top front perspective view of the embodiments of FIG. 1.
Figure 9:
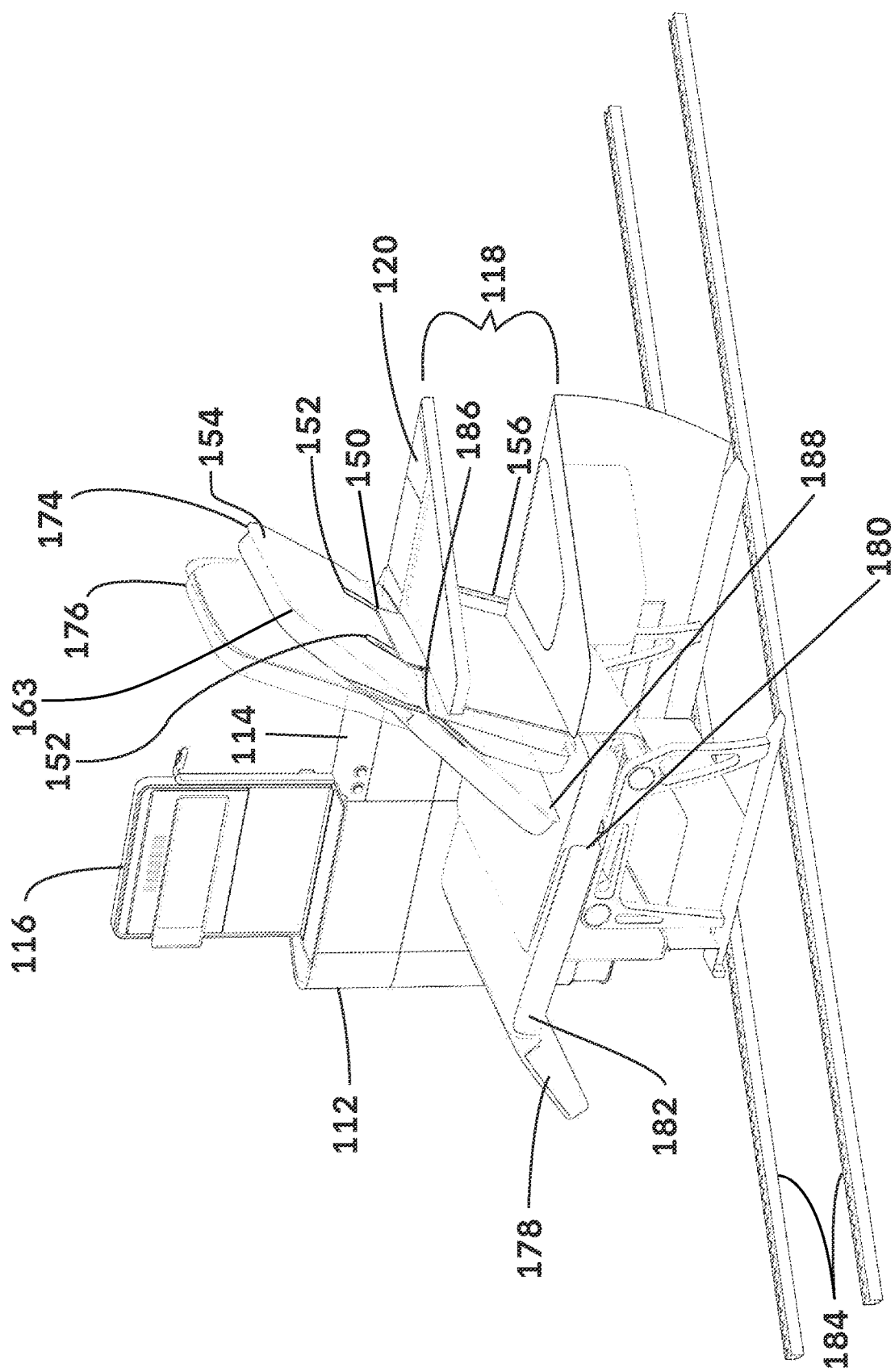
FIG. 9 is a top left-front perspective view of the embodiments of FIG. 1.

FIG. 8A is a top front perspective view of the embodiments of FIG. 1. FIG. 8A illustrates the clearance between the top of seat back 110 at the asymmetric corner 163 and fuselage wall 36 in an upright position 176 (with clearance 172) and in a reclined position 174 (with clearance 170). Seat back 110 is connected to seat pan 108. As seat back 110 reclines, seat pan 108 moved from retracted position 180 to extended position 182 and the bottom of seat back 110 follows seat pan 108. As seat back 110 reclines, asymmetric corner 163, moves back and down toward fuselage wall 36 in an arc such that asymmetric corner 163 follows the curve of fuselage wall 36. Thus, there is a pivot point 186 that does not move either forward or backward as seat back 110 reclines or returns upright. FIG. 8A illustrates that seat assemblies 100, 102 may be mounted in the cabin using mounting tracks 184. As can be seen in FIG. 8A, FIG. 9, and FIG. 10B, the movement of seat pan 108 forward when seat back 110 reclines allows seat 106 to be placed significantly closer to the fuselage or center divider and still recline the full angle 198. The amount that seat 106 may be moved closer to the wall is shown by the distance between seat pan 108 at position 180 and seat pan 108 at position 182. In other words, without seat back 110 pivoting at point 186, seat 106 would have to be moved further from the fuselage to accommodate a full recline angle 198.

In an embodiment, the seat recline mechanism may be dimensioned so that asymmetric corner 163 follows the curvature of the aircraft fuselage wall 36 as seat back 110 reclines.

In embodiments, rear console 118 is dimensioned to be positioned as close to fuselage wall 34, 36 as allowed by airline specifications, e.g., a minimum spacing of 1" to the fuselage wall is known. Airline specifications, however, allow contact with center dividers so the fuselage spacing is typically controlling.

In an embodiment, angle 128 may be customized for a particular cabin by attaching seat assemblies 100, 102 to mounting tracks 184 at an angle preferred for the particular cabin.

Figure 8B:
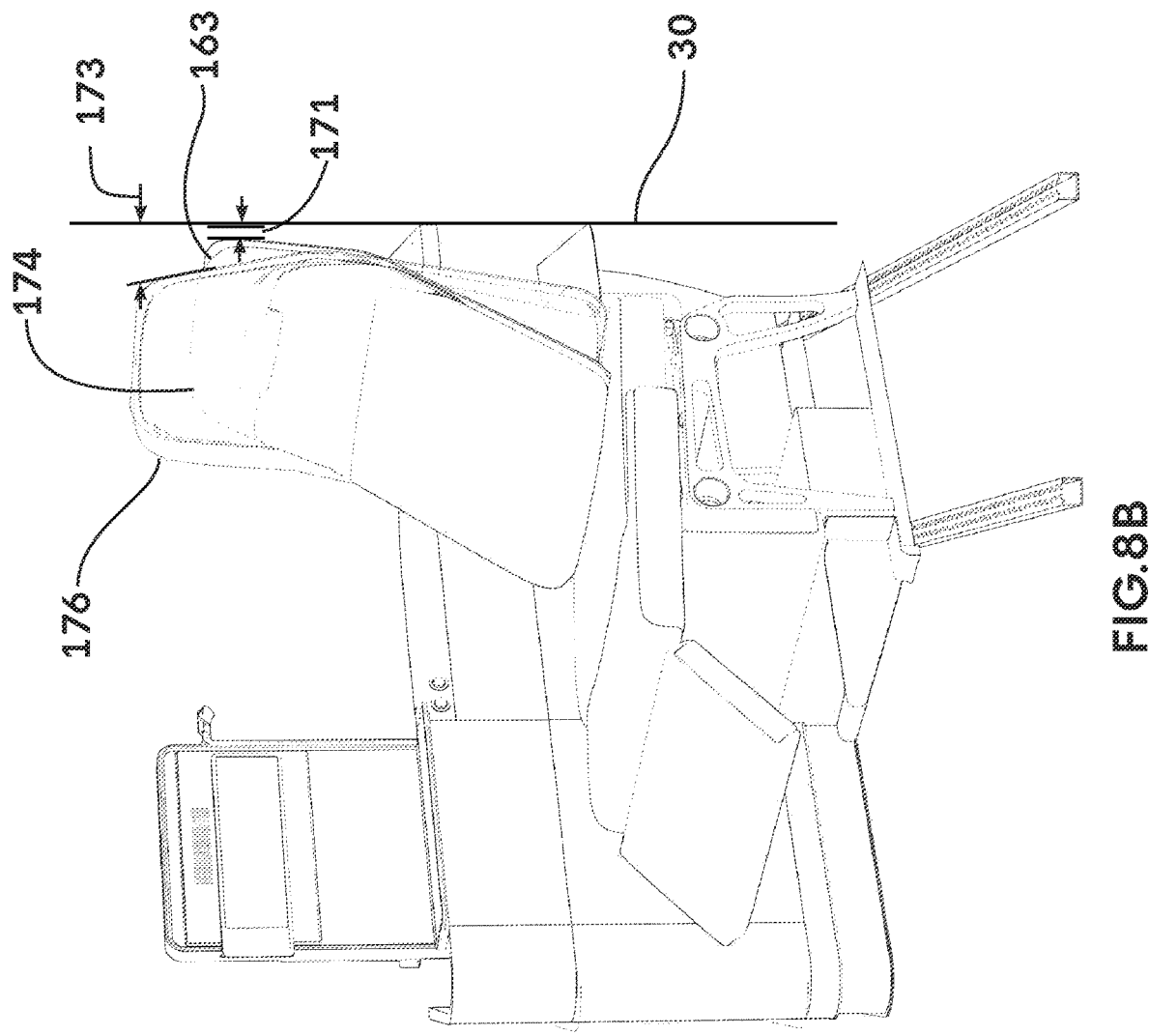
FIG. 8B is a top front perspective view of the embodiments of FIG. 1.

FIG. 8B is a top front perspective view of the embodiments of FIG. 1. FIG. 8B illustrates the clearance between the top of seat back 110 at the asymmetric corner 163 and center divider 30 in an upright position 176 (with clearance 173) and in a reclined position 174 (with clearance 171). Since center divider 30 is a flat vertical wall, the arcing path travelled by corner 163 simply brings corner 163 closer to divider 30. Thus, as shown in FIG. 8A and FIG. 8B, the seat dimensions and reclining mechanism are optimized to the seat layout and the fuselage shape, which accommodates the center divider.

FIG. 9 is a top left-front perspective view of the embodiments of FIG. 1. FIG. 9 further illustrates the location of pivot point 186 and that it corresponds to the fixed position of elements of sliding pivot 150. Sliding pivot 150, in actuality, slides with respect to backplate 154 and is otherwise fixed, e.g., with regard to the cabin). FIG. 9 further illustrates that seat back 110 and seat pan 108 are linked at a pivot point 188, and that rear console 118 is connected to fixed structure 156.

Figure 10A:
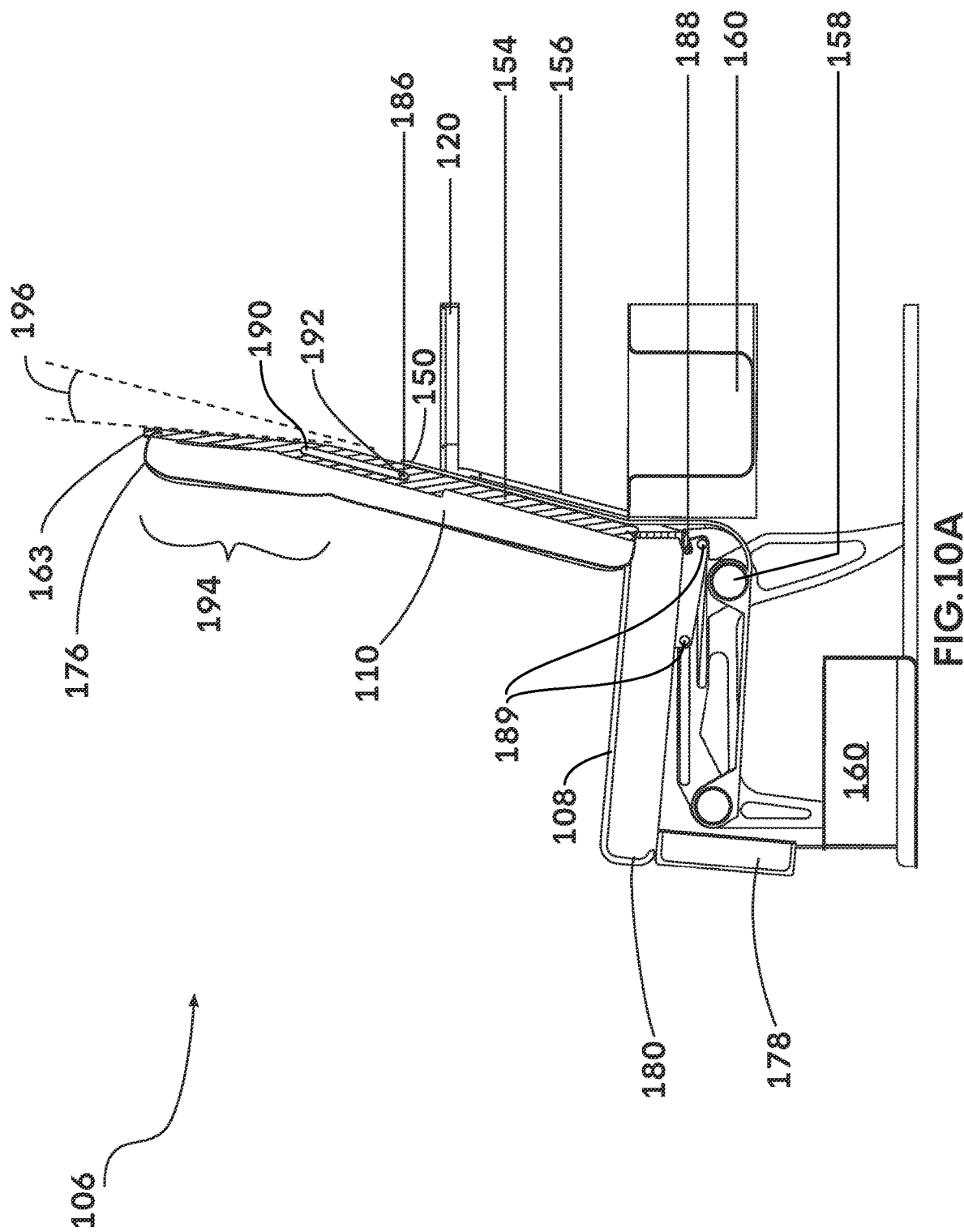
FIG. 10A is seat-side cross-sectional view of elements of the embodiments of FIG. 1 in a first state.

FIG. 10A is a seat-side cross-sectional view of elements of the embodiments of FIG. 1 in upright state 176. In FIG. 10A, seat 108 is shown to move with respect to frame 158 at pivot points 189, which slide within slots in frame 158 as seat 108 moves forward when reclining. FIG. 10A further illustrates that sliding pivot 150 includes a rod 192 that travels within an internal slot 190 connecting pivot tracks 152 (FIG. 4H). When seat back 110 reclines, rod 192 of sliding pivot 150 travels upwards within internal slot as a headrest section 194 tilts backward and downward. In FIG. 10A it can be seen that headrest section 194 is at an offset angle 196 forward from backplate 154.

FIG. 10B is seat-side cross-sectional view of the elements of FIG. 10B in reclined state 174. In FIG. 10B, seat 108 is shown to have moved forward with respect to frame 158 and rod 192 has slid upward in slot 190. Fixed structure 156 has remained stationary. In reclining, seat back 110 has tilted backwards an additional angle 198 and downward (as shown by the length of slot 190 that is below rod 192).

Figure 11:
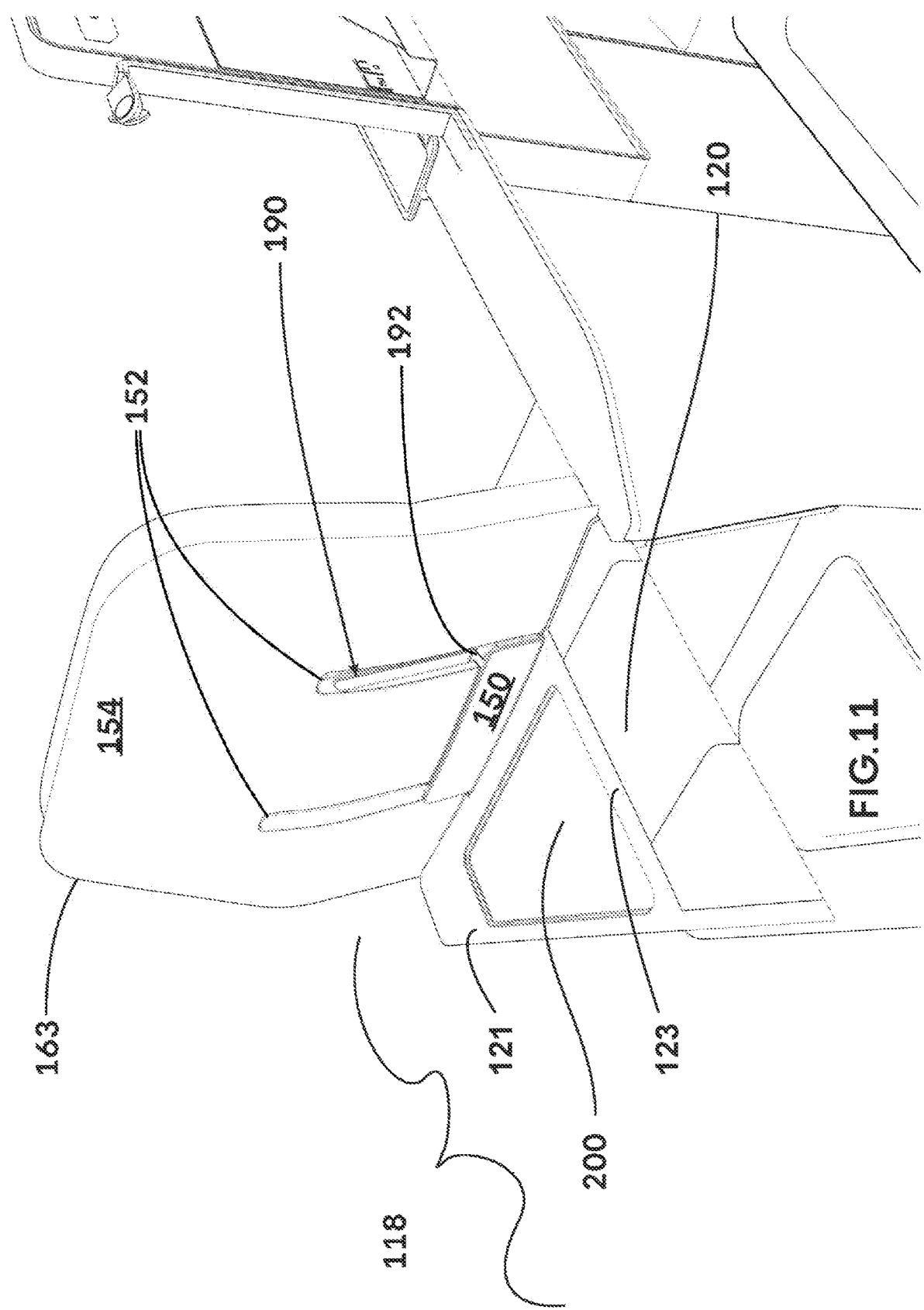
FIG. 11 is a left-rear perspective view of details of the embodiments of FIG. 1.

FIG. 11 is a left-rear perspective view of details of the embodiments of FIG. 1. FIG. 11 further illustrates that slot 192 connects between pivot tracks 152 within backplate 154, which allows rod 192 of sliding pivot 150 to slide with respect to backplate 154 between the reclined and upright positions. In FIG. 11, rear console 118 is shown to include a depression 200, which helps to keep items placed on rear console 118 from falling off platform section 121.

Figure 12:
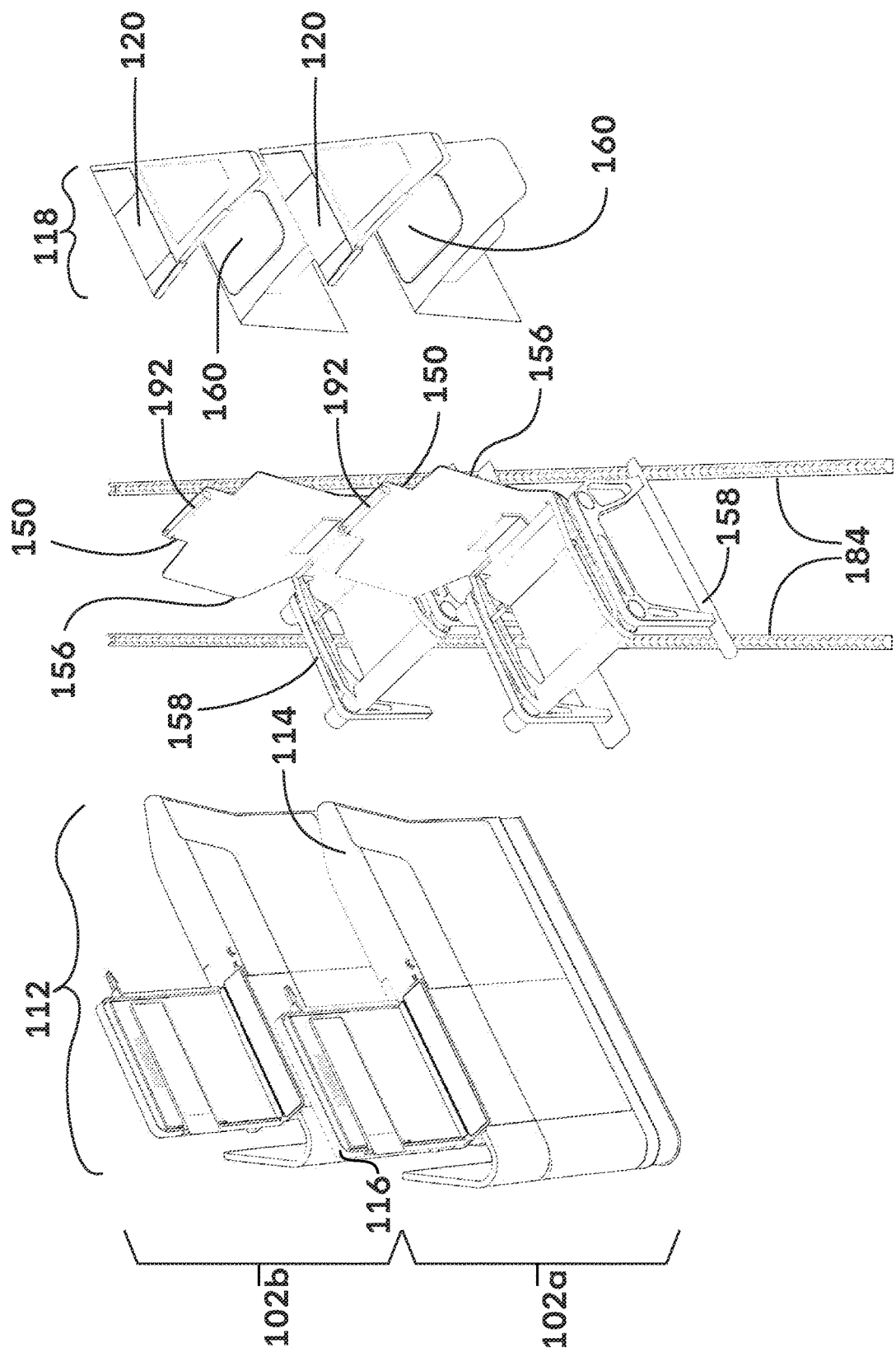
FIG. 12 is a top left-front perspective view of a partial assembly of elements of the embodiments of FIG. 1.

FIG. 12 is a top left-front perspective view of a partial assembly of elements of the embodiments of FIG. 1. FIG. 12 further illustrates the construction and installation of seating assembly 102 (seating assembly 100 being a mirror image). Seating assembly 102 is assembled by connecting fixed structure 156 (which includes sliding pivot 150) to frame 158. Divider 112 is connected to frame 158 as well. Rear console 118 is connected to fixed structure 156. Seating assembly 102 is installed in the cabin by connecting frame 158 to mounting tracks 184. Thus, the installation of a single structure, e.g., seating assembly 102a, provides part of the environment for two passengers, e.g., a passenger occupying seat assembly 102a and a passenger occupying seat assembly 102b.

In the description above and throughout, numerous specific details are set forth in order to provide a thorough understanding of an embodiment of this disclosure. It will be evident, however, to one of ordinary skill in the art, that an embodiment may be practiced without these specific details. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. In other instances, well-known structures and devices are shown in simplified form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

We claim:

1. A first seat comprising:
a support structure including a seat back support;
a seat pan connected to the support structure;
a seat back connected to the support structure with the seat back contacting and pivotable with respect to the seat back support; and
a first armrest connected to the seat back support and extending away from the seat back without extending laterally beyond a width of the seat back, an upper portion of the seat back directly overhanging at least a portion of the first armrest, such that the first armrest is usable from a second seat when the first seat and the second seat are installed in a cabin with the first seat in a first row and the second seat in a second row behind the first row.

2. The first seat of claim 1, wherein the first seat further includes:
a platform section connected to the support structure with the upper portion of the seat back directly overhanging at least a portion of the platform section and the platform section extending parallel to a plane defined by an upper surface of the first armrest from the first armrest across the seat back without extending laterally beyond the width of the seat back and tapering in the plane from a wider section of the platform connected to the first armrest such that an edge of the platform section furthest from the seat back is at a first angle from a seat centerline of from 45 to 70 degrees.

3. The first seat of claim 2, wherein:
the seat back reclines with respect to the support structure;
a headrest section of the seat back is configured to provide, when the first seat is installed in the cabin next to a fuselage:
a first minimum clearance between the seat back and the fuselage, the first minimum clearance being located between a point on the headrest section and the fuselage when the seat back is reclined; and
a second minimum clearance between the seat back and the fuselage, the second minimum clearance being located between the point on the headrest section and the fuselage when the seat back is upright.

4. The first seat of claim 3, wherein the headrest section of the seat back being dimensioned to provide the first minimum clearance between the seat back and the fuselage includes:
the headrest section is reduced in area on a side of the headrest section nearest the fuselage such that the headrest section is asymmetrical about the first seat centerline; and
the point is on the reduced side of the headrest section.

5. The first seat of claim 4, wherein the headrest section asymmetry results from the side of the headrest section furthest from the first armrest not including a corner that is present on a side of the headrest section nearest to the first armrest.

6. The first seat of claim 3, wherein:
the headrest section of the seat back is dimensioned to provide, when the first seat is installed in the cabin next to a vertical wall and the seat back is reclined, a third minimum clearance between the first seat and the vertical wall.

7. The first seat of claim 3 further including a pivot assembly connecting the support structure to the seat back, wherein:
when the seat back reclines with respect to the support structure the headrest section moves back with respect to the support structure and the seat pan moves forward with respect to the support structure; and
an element of the pivot assembly accommodates the reclining of the seat back by travelling within a slot in the seat back.

8. The first seat of claim 2 further including a divider connected to the support structure, the divider providing, when the first seat is installed in the cabin:
a second armrest extending forward of the seat back and configured for use from the first seat; and
a footrest configured for use from the second seat.

9. A seating arrangement comprising:
a first seat including:
a support structure including a seat back support;
a seat pan connected to the support structure;
a seat back connected to the support structure with the seat back contacting and pivotable with respect to the seat back support;
a first armrest connected to the seat back support and extending away from the seat back without extending laterally beyond a width of the seat back, an upper portion of the seat back directly overhanging at least a portion of the first armrest; and
a second seat identical to the first seat, wherein, when the first seat is installed in a first row and the second seat is installed in a second row behind the first row, the first armrest is usable from the second seat.

10. The seating arrangement of claim 9, wherein:
the first seat and second seat each further includes:
a platform section connected to the support structure with the upper portion of the seat back directly overhanging at least a portion of the platform section and the platform section extending parallel to a plane defined by an upper surface of the first armrest from the first armrest across the seat back without extending laterally beyond the width of the seat back and tapering in the plane from a wider section of the platform connected to the first armrest such that an edge of the platform section is at a first angle from a seat centerline of from 45 to 70 degrees.

11. The seating arrangement of claim 10, wherein:
the seat back reclines with respect to the support structure; and
a headrest section of the seat back is dimensioned to provide, when the first seat and the second seat are installed next to a fuselage and the seat backs are reclined, a first minimum clearance between the first seat and the fuselage and between the second seat and the fuselage.

12. The seating arrangement of claim 11, wherein the headrest section of the seat back being dimensioned to provide the first minimum clearance between the seat back and the fuselage includes:

the headrest section is reduced in area on a side of the headrest section nearest the fuselage such that the headrest section is asymmetrical about the first seat centerline; and the first minimum clearance is measured from a point on the reduced side of the headrest section.

13. The seating arrangement of claim 11, wherein:

the headrest section of the seat back is dimensioned to provide, when the first seat is installed next to a vertical wall and the seat back is reclined, a second minimum clearance between the first seat and the vertical wall.

14. The seating arrangement of claim 11 further including a pivot assembly connecting the support structure to the seat back, wherein:

when the seat back reclines with respect to the support structure the headrest section moves back with respect to the support structure and the seat pan moves forward with respect to the support structure; and an element of the pivot assembly accommodates the reclining of the seat back by travelling within a slot in the seat back.

15. The seating arrangement of claim 10 further including a divider connected to the support structure, the divider providing, when the first seat and the second seat are installed:

a second armrest extending forward of the seat back and configured for se from the first seat; and a footrest configured for use from the second seat.

16. The seating arrangement of claim 15, wherein, when the first seat and the second seat are installed, the first seat and the second seat each have direct access to an aisle.

17. A row of seats comprising:

four seats, each seat including:

a support structure including a seat back support;

a seat pan connected to the support structure;

a seat back connected to the support structure with the seat back contacting and pivotable with respect to the seat back support; and a first armrest connected to the seat back support and extending away from the seat back without extending laterally beyond a width of the seat back, an upper portion of the seat back directly overhanging at least a portion of the first armrest, wherein, when the row of seats is installed and a second row of seats identical to the first row of seats is installed parallel to the first row of seats, each first armrest is usable from a different seat in the second row.

18. The row of seats of claim 17, wherein:

a first seat and a third seat of the row are identical;

a second seat and a fourth seat of the first row are identical, wherein:

the second seat is configured to be a mirror image of the first seat across a first aisle;

the fourth seat is configured to be a mirror image of the third seat across a second aisle; and each seat further includes: a platform section connected to the support structure with the upper portion of the seat back directly overhanging at least a portion of the platform section and the platform section extending parallel to a plane defined by an upper surface of the first armrest from the first armrest across the seat back without extending laterally beyond the width of the seat back and tapering in the plane from a wider section of the platform connected to the first armrest such that an edge of the platform section is at a first angle from a seat centerline of from 45 to 70 degrees.

19. The row of seats of claim 18, wherein:

for each seat, the seat back reclines with respect to the support structure; and headrest sections of the seat backs of the first seat and fourth seat are dimensioned to provide, when the first seat and the fourth seat are installed next to a fuselage and the seat backs are reclined, a first minimum clearance between the first seat and the fuselage and between the fourth seat and the fuselage.

20. The row of seats of claim 19, wherein the headrest sections of the seat backs of the first seat and fourth seat being dimensioned to provide a first minimum clearance between the first seat and the fuselage and between the fourth seat and the fuselage includes:

the headrest section is reduced in area on a side of the headrest section nearest the fuselage such that the headrest section is asymmetrical about the first seat centerline for the first seat and about the second seat centerline for the fourth seat; and the first minimum clearance is measured from a point on the reduced side of the headrest section.

21. The row of seats of claim 19, wherein:

headrest sections of the seat backs of the second seat and third seat are dimensioned to provide, when the second seat and the third seat are installed next to a vertical wall and the seat backs are reclined, a second minimum clearance between the second seat and the vertical wall and between the third seat and the vertical wall.

22. The row of seats of claim 21, wherein, when the row of seats is installed and a second row of seats identical to the row of seats is installed parallel to the row of seats, each seat has direct access to either the first aisle or the second aisle.

23. The first seat of claim 1, wherein the seat back is pivotably connected to the seat back support at a location elevated with respect to the seat pan.

* * * * *